United States Patent
Cho et al.

(10) Patent No.: US 10,991,994 B2
(45) Date of Patent: Apr. 27, 2021

(54) TEMPERATURE MONITORING APPARATUS AND METHOD FOR BATTERY PACK

(71) Applicant: LG Chem, Ltd., Seoul (KR)

(72) Inventors: Su-Ho Cho, Daejeon (KR); Chi-Ho Moon, Daejeon (KR); Kyung-Hoon Suk, Daejeon (KR); Hong-Seok Ju, Daejeon (KR)

(73) Assignee: LG Chem, Ltd.

( * ) Notice: Subject to any disclaimer, the term of this patent is extended or adjusted under 35 U.S.C. 154(b) by 302 days.

(21) Appl. No.: 16/060,829

(22) PCT Filed: Aug. 2, 2017

(86) PCT No.: PCT/KR2017/008355
§ 371 (c)(1),
(2) Date: Jun. 8, 2018

(87) PCT Pub. No.: WO2018/030704
PCT Pub. Date: Feb. 15, 2018

(65) Prior Publication Data
US 2019/0006724 A1    Jan. 3, 2019

(30) Foreign Application Priority Data

Aug. 12, 2016  (KR) .................... 10-2016-0102925

(51) Int. Cl.
*H01M 10/48*     (2006.01)
*H01M 10/42*     (2006.01)
(Continued)

(52) U.S. Cl.
CPC .......... *H01M 10/486* (2013.01); *B60L 58/10* (2019.02); *B60L 58/12* (2019.02); *B60L 58/21* (2019.02);
(Continued)

(58) Field of Classification Search
CPC ............ H01M 10/486; H01M 10/482; H01M 10/633; H01M 10/425; H01M 50/20;
(Continued)

(56) References Cited

U.S. PATENT DOCUMENTS

2008/0224662 A1    9/2008  Hayakawa
2012/0295139 A1    11/2012  Jeong et al.
(Continued)

FOREIGN PATENT DOCUMENTS

CN    101267124 A    9/2008
CN    103098298 A    5/2013
(Continued)

OTHER PUBLICATIONS

Supplementary European Search Report for EP Application No. 17839722, dated Dec. 4, 2018.
(Continued)

*Primary Examiner* — Stephen J Yanchuk
(74) *Attorney, Agent, or Firm* — Lerner, David, Littenberg, Krumholz & Mentlik, LLP (57) ABSTRACT

Provided are temperature monitoring apparatus and method for a battery pack. The temperature monitoring apparatus includes a plurality of slave battery management systems (BMSs) including a first slave BMS and a second slave BMS; and a master BMS connected to the plurality of slave BMSs to communicate with them. The master BMS sets a next wake-up time of the second slave BMS based on first temperature data indicating a temperature of a first battery module from among a plurality of battery modules and transmitted from the first slave BMS.

13 Claims, 5 Drawing Sheets

(51) Int. Cl.
*B60L 58/21* (2019.01)
*B60L 58/10* (2019.01)
*B60L 58/24* (2019.01)
*B60L 58/12* (2019.01)
*H01M 50/20* (2021.01)
*H01M 10/633* (2014.01)

(52) U.S. Cl.
CPC ........... *B60L 58/24* (2019.02); *H01M 10/425* (2013.01); *H01M 10/482* (2013.01); *H01M 10/633* (2015.04); *H01M 50/20* (2021.01); *B60L 2240/545* (2013.01); *B60L 2240/80* (2013.01); *H01M 2220/20* (2013.01); *Y02T 10/70* (2013.01); *Y02T 10/92* (2013.01)

(58) Field of Classification Search
CPC .... H01M 2220/20; B60L 58/10; B60L 58/21; B60L 58/24; B60L 58/12; B60L 2240/545; B60L 2240/80; Y02T 2240/545; Y02T 2240/70
See application file for complete search history.

(56) References Cited

U.S. PATENT DOCUMENTS

| | | | |
|---|---|---|---|
| 2013/0183554 A1 | 7/2013 | Takanezawa et al. | |
| 2013/0253715 A1 | 9/2013 | Cho et al. | |
| 2014/0002025 A1* | 1/2014 | Yamamoto | H02J 7/007192 |
| | | | 320/109 |
| 2014/0095092 A1 | 4/2014 | Ikeda et al. | |
| 2014/0300364 A1 | 10/2014 | Choi | |
| 2014/0329114 A1 | 11/2014 | Rimac | |
| 2016/0059717 A1 | 3/2016 | Murata et al. | |
| 2016/0195587 A1 | 7/2016 | Lee | |
| 2017/0190261 A1* | 7/2017 | Cheng | B60L 50/60 |
| 2017/0237128 A1* | 8/2017 | Kubo | H02J 7/0025 |
| | | | 429/7 |
| 2017/0350946 A1* | 12/2017 | Mukaitani | H01M 10/482 |
| 2018/0173292 A1* | 6/2018 | Enomoto | H01M 10/482 |

FOREIGN PATENT DOCUMENTS

| | | |
|---|---|---|
| CN | 103563210 A | 2/2014 |
| CN | 103636087 A | 3/2014 |
| CN | 103713263 A | 4/2014 |
| CN | 104103861 A | 10/2014 |
| CN | 105390770 A | 3/2016 |
| EP | 2685550 A1 | 1/2014 |
| EP | 2797336 A2 | 10/2014 |
| JP | 2006-210244 A | 8/2006 |
| KR | 10-2012-0117470 A | 10/2012 |
| KR | 20120127935 A | 11/2012 |
| KR | 20130044353 A | 5/2013 |
| KR | 10-2015-0071194 A | 6/2015 |
| KR | 10-2016-0076864 A | 7/2016 |
| KR | 10-2016-0085070 A | 7/2016 |

OTHER PUBLICATIONS

International Search Report and Written Opinion, dated Dec. 6, 2017, for Application No. PCT/KR2017/008355 (with English translation of Search Report).

Chinese Search Report for Application No. 201780005222.4 dated Aug. 3, 2020, 2 pages.

* cited by examiner

TEMPERATURE MONITORING APPARATUS AND METHOD FOR BATTERY PACK

TECHNICAL FIELD

The present disclosure relates to an apparatus and method of optimally managing temperature of a battery pack used in an electric vehicle, etc.

The present application claims priority to Korean Patent Application No. 10-2016-0102925 filed on Aug. 12, 2016 in the Republic of Korea, the disclosure of which is incorporated herein by reference.

BACKGROUND

Recently, demand for portable electronic devices such as laptops, video cameras, mobile phones, etc. has been rapidly increasing, and electric vehicles, energy storing batteries, robots, satellites, etc. have been developed. Accordingly, research onto a high-performance battery that is repeatedly rechargeable has been actively conducted.

Nickel cadmium batteries, nickel hydrogen batteries, nickel zinc batteries, lithium secondary batteries, etc. are currently commercialized, and the lithium secondary batteries among those batteries are highlighted due to such advantages as free charging/discharging because a memory effect rarely occurs in the lithium secondary batteries when being compared with nickel-based secondary batteries, very low self-discharging rate, and high energy density.

A minimum unit of a battery may be referred to as a battery cell, and a plurality of battery cells connected in series may configure a battery module. Also, a plurality of battery modules are connected in series or in parallel with one another to form a battery pack.

A battery pack mounted in an electric vehicle, etc. generally includes a plurality of battery modules connected in series or in parallel with one another. States of each battery module included in the battery pack and battery cells included in each battery module are generally monitored by at least one battery management system (BMS). The BMS waits for a driving command from outside (e.g., ECU of a vehicle) while consuming low power in a sleep mode, and performs a monitoring operation, a balancing operation, a cooling operation, a charging operation, and a discharging operation in a wake-up mode.

In particular, the battery pack has to be cooled down appropriately in order to ensure stabilized operation of the battery pack. To do this, the BMS has to repeatedly check a temperature of the battery pack or the battery module included in the battery pack according to lapse of time. However, besides a motor of an electric vehicle, the BMS is also operated by electric energy supplied from the battery pack, and thus, in a case where the BMS unnecessarily switches to a wake-up mode to perform monitoring of a temperature of the battery pack even when the temperature of the battery pack is within an appropriate temperature range, over-discharge may occur due to degradation in a charging amount of the battery pack.

SUMMARY

The present disclosure is designed to solve the problems of the related art, and therefore the present disclosure is directed to providing a temperature monitoring apparatus and method for a battery pack, in which times for switching a plurality of BMSs that manage the battery pack from a sleep mode to a wake-up mode, according to temperatures of a plurality of battery modules included in the battery pack are set individually.

The other objects and advantages of the present disclosure will be apparent from the following description and the exemplary embodiments of the present disclosure. Also, it will be readily understood that the objects and advantages of the present disclosure are realized by the means and combinations thereof set forth in the appended claims.

In one aspect of the present disclosure, there is provided a temperature monitoring apparatus for a battery pack, the temperature monitoring apparatus including: a plurality of slave battery management systems (BMSs) including a first slave BMS and a second slave BMS; and a master BMS connected to the plurality of slave BMSs to communicate with the plurality of slave BMSs, wherein each of the plurality of slave BMSs is configured to switch from a sleep mode to a wake-up mode when a wake-up time set in advance thereto by the master BMS is reached, to measure a temperature of a battery module set thereto from among the plurality of battery modules included in the battery pack, during a wake-up period that is defined as a period from a latest time point of switching to the wake-up mode to a time point of re-switching to the sleep mode, and to transmit to the master BMS temperature data indicating the temperature measured during the wake-up period, and the master BMS is configured to set a next wake-up time of the second slave BMS based on first temperature data transmitted from the first slave BMS and indicating a temperature of a first battery module from among the plurality of battery modules.

Also, the master BMS may be configured to receive driving data notifying a driving state of an electric vehicle from the electric vehicle including the battery pack, to determine whether an event set in advance is being performed, based on the driving data, and to set a next wake-up time of the second slave BMS based on the first temperature data transmitted from the first slave BMS, while the event set in advance is being performed.

Also, the master BMS may be configured to set a wake-up time, different from a wake-up time set to one of the plurality of slave BMSs, to at least one of the other slave BMSs.

Also, the master BMS may be configured to set a time equivalent to a sum of a current time and a first set time period as a next wake-up time of the second slave BMS, when the temperature of the first battery module is lower than a first set temperature. In this case, the second slave BMS may be configured to transmit to the master BMS second temperature data indicating a temperature of the second battery module from among the plurality of battery modules.

Also, the master BMS may be configured to set a time equivalent to a sum of a current time and a second set time period as a next wake-up time of the second slave BMS, when the temperature of the first battery module is equal to or higher than the first set temperature and lower than a second set temperature. In this case, the second set time period may be shorter than the first set time period.

Also, the plurality of slave BMSs may further include a third slave BMS configured to transmit to the master BMS third temperature data indicating a temperature of a third battery module from among the plurality of battery modules. In this case, the master BMS may be configured to calculate a difference value by subtracting the temperature of the second battery module from the temperature of the first battery module, and to set a next wake-up time of the third slave BMS based on the second temperature data and the difference value.

Also, the master BMS may be configured to set a time equivalent to a sum of a current time and a third set time period as a next wake-up time of the second slave BMS when the difference value is a negative value, and to set a time equivalent to a sum of the current time and a fourth set time period as a next wake-up time of the second slave BMS when the difference value is a positive value. In this case, the fourth set time period may be longer than the third set time period.

Also, the first temperature data may include a plurality of temperature values of the first battery module measured at a plurality of different time points during the wake-up period of the first slave BMS. The master BMS may be configured to analyze a variation pattern in a temperature of the first battery module shown in the wake-up period, based on the plurality of temperature values included in the first temperature data, and to set a next wake-up time of the second slave BMS further based on the variation pattern.

In another aspect of the present disclosure, there is also provided a battery pack including the temperature monitoring apparatus for the battery pack.

In another aspect of the present disclosure, there is also provided an electric vehicle comprising the battery pack.

In another aspect of the present disclosure, there is also provided a temperature monitoring method for a battery pack, the temperature monitoring method including: a first slave battery management system (BMS) switching from a sleep mode to a wake-up mode when a wake-up time set to the first slave BMS in advance is reached; the first slave BMS measuring a temperature of a first battery module from among a plurality of battery modules included in a battery pack, during a wake-up period that is defined as a period from a latest time point of switching to the wake-up mode to a time point of re-switching to the sleep mode; the first slave BMS transmitting to a master BMS first temperature data indicating the temperature of the first battery module measured during the wake-up period; the master BMS setting a next wake-up time of a second slave BMS based on the first temperature data; the second slave BMS switching from the sleep mode to the wake-up mode when a wake-up time set thereto by the master BMS is reached; and the second slave BMS measuring a temperature of a second battery module from among a plurality of battery modules, during a wake-up period that is defined as a period from a latest time point of switching to the wake-up mode to a time point of re-switching to the sleep mode.

Also, the setting of the next wake-up time of the second slave BMS may include setting a time equivalent to a sum of a current time and a first set time period as a next wake-up time of the second slave BMS, when the temperature of the first battery module is lower than a first set temperature.

Also, the setting of the next wake-up time of the second slave BMS may include setting a time equivalent to a sum of a current time and a second set time period as a next wake-up time of the second slave BMS, when the temperature of the first battery module is equal to or higher than the first set temperature and lower than a second set temperature. Here, the second set time period may be shorter than the first set time period.

According to embodiments of the present disclosure, times for switching a plurality of BMSs that manage a state of a battery pack from a sleep mode to a wake-up mode may be set individually according to a temperature of each of a plurality of battery modules included in the battery pack. As such, power consumption that occurs when a BMS unnecessarily enters the wake-up mode may be reduced.

In addition, a time point for switching each BMS from the sleep mode to the wake-up mode may be adaptively adjusted according to a temperature of the battery pack, and thus, the battery pack may be efficiently cooled down.

The effects of the present disclosure are not limited to the aforementioned effects, and other effects of the present disclosure may be understood by the following description and will become apparent from the embodiments of the present disclosure.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, one or more embodiments of the present disclosure will be described in detail with reference to accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the concept and scope of the disclosure.

In the detailed description of the embodiments of the present disclosure, detailed depictions of well-known related functions and configurations may be omitted so as not to obscure the art of the present disclosure with superfluous detail.

It will be further understood that the terms "comprises" and/or "comprising," when used in this specification, specify the presence of stated components, but do not preclude the presence or addition of one or more components. In addition, the term such as <control unit> provided herein indicates a unit performing at least one function or operation, and may be realized by hardware, software, or a combination of hardware and software.

Moreover, when it is mentioned that a part is "connected" with another part, it means not only "direct connection" but also "indirect connection" with different elements interposed between the two parts.

Hereinafter, an electric vehicle, a battery pack, and a temperature monitoring apparatus according to embodiments of the present disclosure will be described below.

Figure 1:
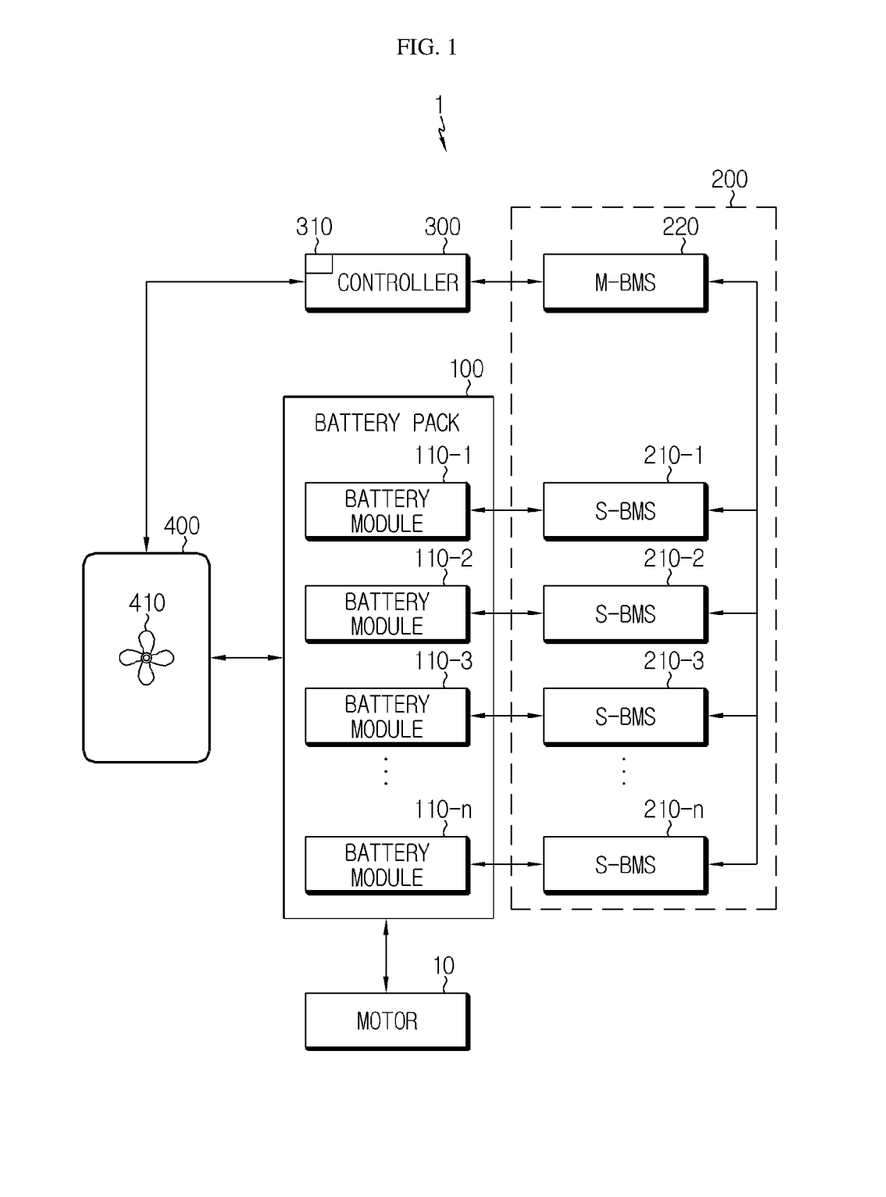
FIG. 1 is a block diagram of a functional configuration of an electric vehicle according to an embodiment of the present disclosure.

FIG. 1 is a block diagram of a functional configuration of an electric vehicle 1 according to an embodiment of the present disclosure.

Referring to FIG. 1, the electric vehicle 1 may include a motor 10, a battery pack 100, a temperature monitoring apparatus 200, a controller 300, and a cooling device 400.

The motor 10 is configured to transform electric energy supplied from the battery pack 100 into rotating energy. The rotating energy of the motor 10 is transferred to wheels, etc. of the electric vehicle 1 to move the electric vehicle 1.

The battery pack 100 may include n battery modules 110-1 to 110-$n$. The battery modules 110-1 to 110-$n$ may be connected in series and/or in parallel with one another in the battery pack 100. Each of the battery modules 110 may include at least one battery cell. Here, the battery cell may denote a minimum unit that may be repeatedly charged and discharged via electrochemical reaction.

The temperature monitoring apparatus 200 includes a plurality of slave battery management systems (BMSs) 210-1 to 210-$n$, and a master BMS 220.

Each of the slave BMSs (hereinafter, referred to as 'S-BMS') 210 may be coupled to at least one battery module 110. FIG. 1 shows that one battery module 110 and one S-BMS 210 are connected to each other in one-to-one correspondence, but the present disclosure is not limited thereto.

Each of the S-BMSs 210 may operate in a sleep mode and a wake-up mode. In the sleep mode, the S-BMS 210 waits for a control signal from the master BMS 220 while consuming low power. In the wake-up mode, each S-BMS 210 is configured to monitor a status of one battery module 110 coupled thereto, and to generate monitoring data notifying the status of the battery module 110 based on a monitoring result.

The monitoring data indicates an independent operating status of the battery module 110, basically includes information about the temperature of the battery module 110, and may additionally include information related to at least one of a voltage, a current, an internal resistance, a state of charge (SOC), and a state of health (SOH). In the data included in the monitoring data, data indicating the temperature of the battery module 110 may be referred to as 'temperature data'.

Each S-BMS 210 may generate temperature data indicating a temperature value measured from a battery module 110 managed by the S-BMS 210 itself, according to a control command from the master BMS 220 that will be described later or according to a predetermined period, and may provide the temperature data to the master BMS 220 connected thereto via a communication network. For example, the communication network may be a wired communication network such as a controller area network (CAN), or a wireless communication network such as Bluetooth. The temperature data may include an identifier of each of the plurality of S-BMSs 210-1 to 210-$n$. Here, each identifier may be individually associated with a temperature value monitored from each of the battery modules 110-1 to 110-$n$.

The master BMS 220 (hereinafter, referred to as 'M-BMS') may receive temperature data provided from the plurality of S-BMSs 210-1 to 210-$n$.

The M-BMS 220 may identify that each temperature value included in the temperature data is monitored from which one of the S-BMSs 210-1 to 210-$n$, based on the identifiers of the S-BMSs 210-1 to 210-$n$ included in the temperature data.

The M-BMS 220 is configured to generate setting data that individually sets wake-up times of the plurality of S-BMSs 210-1 to 210-$n$ based on the temperature data. The setting data may be transferred to at least one of the S-BMSs 210-1 to 210-$n$ through the communication network.

Here, the wake-up time may denote a time for waking up each S-BMS 210. In other words, each S-BMS 210 is switched from the sleep mode to the wake-up mode at a wake-up time set by the setting data. Each S-BMS 210 may switch to the sleep mode automatically after a predetermined time period has passed from a time point of entering the wake-up mode at the set wake-up time. To do this, the S-BMS 210-1 to 210-$n$ and the M-BMS 220 may each include a real-time clock therein. The wake-up time set for each of the S-BMS 210-1 to 210-$n$ may be equal to or different from the others.

The M-BMS 220 collects data notifying the state of the battery pack transmitted from the S-BMSs 210-1 to 210-$n$, and transmits the collected data to the controller 300.

The controller 300 is configured to generate driving data notifying a driving status of the electric vehicle 1. For example, the driving data may include information indicating driving velocity, a geographical location, outside temperature, rotating speed of the motor 10, location of an accelerator pedal, location of a brake pedal, and whether there is a passenger in the electric vehicle 1. The M-BMS 220 may receive the driving data from the controller 300 via the communication network.

The M-BMS 220 may determine whether a predetermined event is happening based on the driving data. The event is determined in advance through a preliminary experiment, etc., to be appropriate for the S-BMS 210 to enter the wake-up mode. For example, a state in which the rotation of the motor 10 is completely stopped or the electric vehicle 1 is turned off may be one example of the event. The M-BMS 220 may identify whether the electric vehicle 1 is turned off based on the driving data. The M-BMS 220 may generate the setting data during the predetermined event is happening.

Also, the controller 300 is configured to generate a control signal for driving the cooling device 400 based on the data provided from the M-BMS 220. For example, when the data provided from the M-BMS 220 notifies that the battery pack 100 is overheated, the controller 300 may output a control signal for supplying electric energy to the cooling device 400.

The above-described controller 300 may be implemented by at least one of application specific integrated circuits (ASICs), digital signal processors (DSPs), digital signal processing devices (DSPDs), programmable logic devices (PLDs), field programmable gate arrays (FPGAs), microcontrollers, microprocessors, and electric units for performing other functions, as hardware. For example, the controller 300 may be implemented as a programmable logic controller (PLC).

The controller 300 may include a memory 310. The memory 310 may store various data and commands required in overall operations regarding the electric vehicle 1. The memory 310 may include a storage medium of at least one of a flash memory type, a hard disk type, a solid state disk (SSD) type, a silicon disk drive (SDD) type, a multimedia card micro type, a random access memory (RAM), a static RAM (SRAM), a read-only memory (ROM), an electrically erasable programmable read-only memory (EEPROM), and a programmable ROM (PROM).

The memory 310 may temporarily or permanently store information processed by other elements directly or indirectly connected to the controller 300 or data related to the other elements.

The cooling device 400 is configured to perform operations for cooling down the battery pack 100 in response to the control signal provided from the controller 300. In detail, the cooling device 400 drives a cooling fan 410 so that heat generated by the battery pack 100 may be discharged outside via a predetermined cooling medium (e.g., air and cooling water). In a case where the temperature value of the battery pack 100 exceeds a critical value set in advance, the controller 300 may adjust a rotating speed of the cooling fan 410 included in the cooling device 400 based on a difference between the temperature value of the battery pack 100 and the critical value.

The temperature value of the battery pack 100 may be determined by the M-BMS 220 based on the temperature value of at least one of the battery modules 110-1 to 110-*n* included in the sensing data. For example, a maximum temperature value from among the temperature values included in the sensing data may be determined as the temperature value of the battery pack 100. As another example, an average temperature value of two or more temperature values included in the sensing data may be determined as the temperature value of the battery pack 100.

FIG. 1 shows that the battery pack 100 only includes the plurality of battery modules 110-1 to 110-*n*, but the battery pack 100 may include the managing device 200 and/or the cooling device 400. For example, the cooling device 400 may be integrally coupled to a case of the battery pack 100.

Hereinafter, it will be assumed that three battery modules 110 are included in the battery pack 100, and the battery modules 110 are respectively referred to as a first battery module 110-1, a second battery module 110-2, and a third battery module 110-3, for convenience of description. In addition, temperatures of the first battery module 110-1, the second battery module 110-2, and the third battery module 110-3 are repeatedly monitored by the first S-BMS 210-1, the second S-BMS 210-2, and the third S-BMS 210-3.

Figure 2:
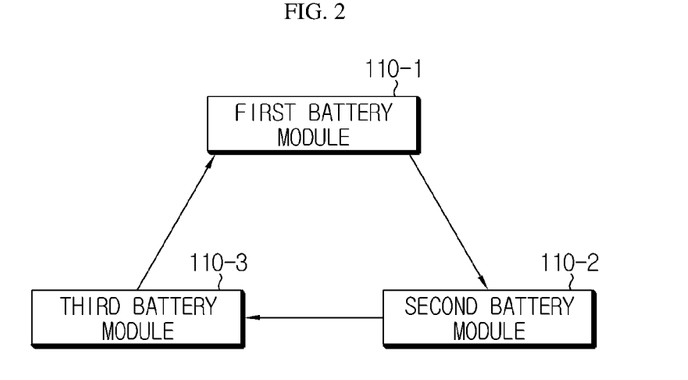
FIG. 2 is a reference diagram for illustrating operations of a temperature monitoring apparatus according to an embodiment of the present disclosure.

FIG. 2 is a reference diagram for illustrating operations of a temperature monitoring apparatus 200 according to an embodiment of the present disclosure.

Referring to FIG. 2, the temperature monitoring apparatus 200 may individually monitor the temperatures of the battery modules 110-1 to 110-3 according to a predetermined order. In detail, the temperature monitoring apparatus 200 may be configured to monitor the temperature of only one of the battery modules at a certain time point.

For example, as indicated by an arrow of FIG. 2, temperatures of the battery modules may be sequentially monitored in an order of the first battery module 110-1, the second battery module 110-2, the third battery module 110-3, and the first battery module 110-1.

In general, the battery modules 110-1 to 110-3 are commonly accommodated in the case of the battery pack 100, and thus, a temperature variation among the battery modules at the same time point would be very small, except for a certain circumstance (e.g., breakdown). In other words, the temperature measured from one of the battery modules may reflect the temperatures of the other battery modules. Therefore, it would be very inefficient to switch all S-BMSs 210-1 to 210-3 managing the state of the battery pack 100 simultaneously from the sleep mode to the wake-up mode in order to monitor the temperature of the battery pack 100.

Instead, the M-BMS 220 of the temperature monitoring apparatus 200 may be configured to set a wake-up time that is different from a wake-up time set for one of the S-BMSs 210-1 to 210-3, for at least one of the other S-BMSs. For example, when a wake-up time for the first S-BMS 210-1 is set in advance as 1 PM, May 10, 2016, the M-BMS 220 may set a time different from 1 PM, May 10, 2016 as a wake-up time for at least one of the second S-BMS 210-2 and the third S-BMS 210-3.

In addition, in a case in which, at a certain time point during the predetermined event occurs, a next wake-up time of one (210-1) of the S-BMSs 210-1 to 210-3 is set in advance whereas next wake-up times for the other S-BMSs 210-2 and 210-3 are not set yet, the M-BMS 220 may determine the next wake-up time of at least one of the S-BMSs 210-2 and 210-3 based on first temperature data transmitted from the first S-BMS 210-1.

This will be described in more detail below with reference to FIGS. 3 to 9.

In FIGS. 3 to 8, a first set temperature $T_{S1}$ may be a lower limit that is set in advance through a preliminary experiment in order to determine whether there is a concern about overheating of the battery pack 100. In addition, a second set temperature $T_{S2}$ may be an upper limit that is set in advance through a preliminary experiment in order to determine whether the battery pack 100 is already overheated. That is, that the temperature of the battery pack 100 is lower than the first set temperature $T_{S1}$ denotes there is no possibility of overheating the battery pack 100. Also, that the temperature of the battery pack 100 is equal to or higher than the second set temperature $T_{S2}$ denotes that the battery pack 100 is already overheated. Also, that the temperature of the battery pack 100 is equal to or greater than the first set temperature $T_{S1}$ and lower than the second set temperature $T_{S2}$ denotes that there is a sign indicating that the battery pack 100 will be overheated soon.

Figure 3:
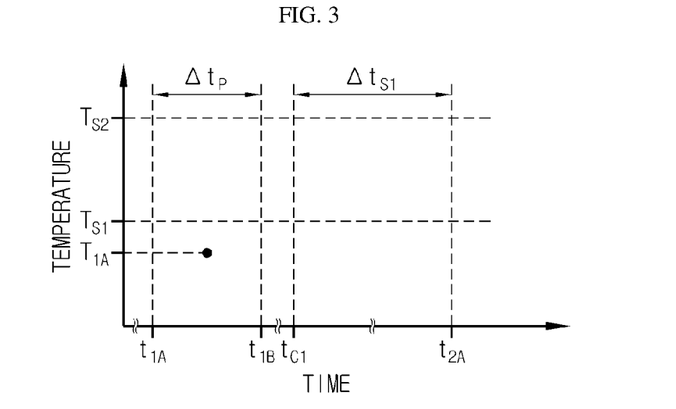
FIGS. 3 and 4 are reference diagrams for illustrating operations of a temperature monitoring apparatus according to an embodiment of the present disclosure.
Figure 4:
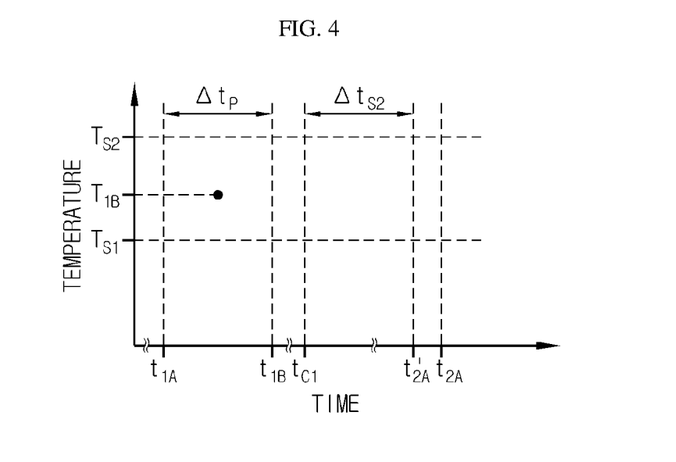

FIGS. 3 and 4 are reference diagrams for illustrating operations of the temperature monitoring apparatus 200 according to an embodiment of the present disclosure.

FIG. 3 exemplarily shows a case in which a temperature $T_{1A}$ of the first battery module 110-1 measured by the first S-BMS 210-1 is lower than the first set temperature $T_{S1}$. In detail, the first S-BMS 210-1 switches to the wake-up mode at a wake-up time $t_{1A}$ that is notified last by the M-BMS 220. That is, the first S-BMS 210-1 remains in the sleep mode until the wake-up time $t_{1A}$ is reached from the last time point of switching to the sleep mode, and then, when the wake-up time $t_{1A}$ set thereto in advance is reached, the first S-BMS 210-1 maintains in the wake-up mode during a predetermined maintaining time period $\Delta t_p$. That is, the first S-BMS 210-1 switches to the sleep mode again when the maintaining time period $\Delta t_p$ has passed from the wake-up time $t_{1A}$. A period from the latest wake-up time $t_{1A}$ to a time point $t_{1B}$ of switching to the sleep mode again may be referred to as a wake-up period. That is, the maintaining time period $\Delta t_p$ denotes a time length of each wake-up period.

As described above, since the temperature $T_{1A}$ of the first battery module 110-1 is lower than the first set temperature $T_{S1}$, there is no concern about the overheating of the first battery module 110-1, and thus, one of ordinary skill in the art would appreciate that there is no concern or a little concern about overheating of the other battery modules 110-2 and 110-3. Therefore, the wake-up time of the second S-BMS 210-2 for measuring the temperature of the second battery module 110-2 may be delayed from the wake-up time of a case where the temperature $T_{1A}$ of the first battery module 110-1 is equal to or higher than the first set temperature $T_{S1}$.

When the temperature $T_{1A}$ of the first battery module 110-1 is lower than the first set temperature $T_{S1}$, the M-BMS 220 may set a time equivalent to a sum of a current time to and a first set time period $\Delta t_{S1}$ as a next wake-up time $t_{2A}$ of the second S-BMS 210-2. That is, the next wake-up time $t_{2A}$ of the second S-BMS 210-2 is a time when the first set time period $\Delta t_{S1}$ passes from the current time $t_{C1}$. Here, the current time $t_{C1}$ is equal to the time $t_{1B}$ or after the time $t_{1B}$. In FIG. 3, the second S-BMS 210-2 and the third S-BMS 210-3 may be in the sleep mode at least from the time $t_{1A}$ to the time $t_{2A}$.

Unlike FIG. 3, FIG. 4 exemplarily shows a case in which the temperature $T_{1B}$ of the first battery module 110-1 measured in the wake-up period by the first S-BMS 210-1 is equal to or higher than the first set temperature $T_{S1}$ and lower than the second set temperature $T_{S2}$. That is, the temperature LB of the first battery module 110-1 is higher than the temperature $T_{1A}$ in FIG. 3.

That the temperature LB of the first battery module 110-1 is equal to or higher than the first set temperature $T_{S1}$ and lower than the second set temperature $T_{S2}$ denotes there is a high possibility of overheating the first battery module 110-1, and thus, it is necessary to monitor the temperature of the battery pack 100 with a relatively short period. To do this, the M-BMS 220 may set a time equivalent to a sum of the current time to and a second set time period $\Delta t_{S2}$ as a next wake-up time $t_{2A}'$ of the second S-BMS 210-2. That is, the next wake-up time $t_{2A}'$ of the second S-BMS 210-2 is a time when the second set time period $\Delta t_{S2}$ passes from the current time $t_{C1}$.

Here, the second set time period $\Delta t_{S2}$ is shorter than the first set time period $\Delta t_{S1}$. Thus, the second S-BMS 210-2 may switch to the wake-up mode faster by a time period $\Delta t_{S1} - \Delta t_{S2}$ than a case where the temperature $T_{1A}$ of the first battery module 110-1 is lower than the first set temperature $T_{S1}$. In FIG. 4, the second S-BMS 210-2 and the third S-BMS 210-3 may be in the sleep mode at least from the time $t_{1A}$ to the time $t_{2A}'$.

Figure 5:
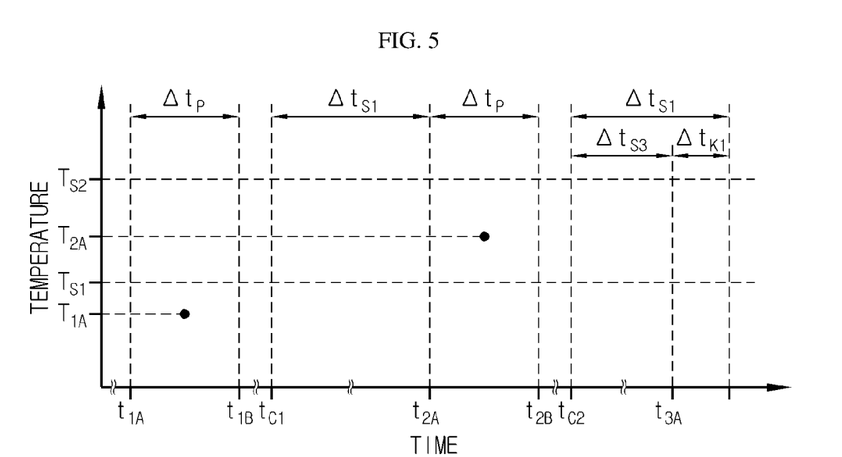
FIGS. 5 and 6 are reference diagrams for illustrating operations of a temperature monitoring apparatus according to another embodiment of the present disclosure.
Figure 6:
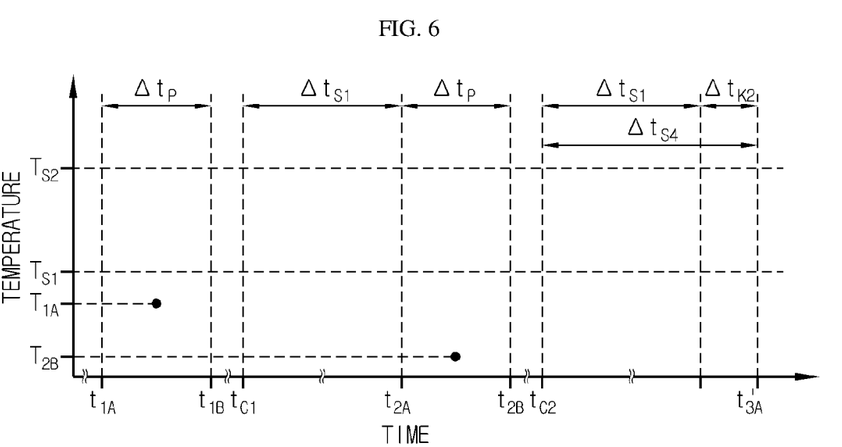

FIGS. 5 and 6 are reference diagrams for illustrating operations of a temperature monitoring apparatus 200 according to another embodiment of the present disclosure.

FIGS. 5 and 6 exemplarily show a case in which the second S-BMS 210-2 is switched to the wake-up mode at a wake-up time $t_{2A}$ set by the M-BMS 220, like in FIG. 3.

Referring to FIG. 5, the second S-BMS 210-2 may be switched to the sleep mode again at a time point $t_{2B}$ when a maintaining time period $\Delta t_p$ has passed from the wake-up time $t_{2A}$. That is, the second S-BMS 210-2 may operate in the wake-up mode during the maintaining time period $\Delta t_p$ from the wake-up time $t_{2A}$. During the wake-up period of the second S-BMS 210-2, the second S-BMS 210-2 measures the temperature $T_{2A}$ of the second battery module 110-2 and transmits second temperature data indicating the temperature of the second battery module 110-2 to the M-BMS 220. As shown in FIG. 5, the temperature $T_{2A}$ of the second battery module 110-2 may be equal to or higher than the first set temperature $T_{S1}$ and lower than the second set temperature $T_{S2}$.

In this case, the M-BMS 220 may set a time equivalent to a sum of a current time $t_{C2}$ and a first set time period $\Delta t_{S1}$ as a next wake-up time of the third S-BMS 210-3, like the above-described manner with reference to FIG. 3.

Instead, the M-BMS 220 may set the next wake-up time of the third S-BMS 210-3 through a different calculation process. Preferably, the M-BMS 220 may set a next wake-up time of the third S-BMS 210-3 further based on a result of comparing the temperature $T_{1A}$ of the first battery module 110-1 with the temperature $T_{2A}$ of the second battery module 110-2.

In detail, the M-BMS 220 may calculate a difference value by subtracting the temperature $T_{2A}$ of the second battery module 110-2 from the temperature $T_{1A}$ of the first battery module 110-1, which is measured latest by the first S-BMS 210-1, that is, $T_{1A} - T_{2A}$. When the difference value is a positive value, it denotes that the temperature $T_{2A}$ of the second battery module 110-2 is lower than the temperature $T_{1A}$ of the first battery module 110-1. On the contrary, when the difference value is a negative value, it denotes that the temperature $T_{2A}$ of the second battery module 110-2 is higher than the temperature $T_{1A}$ of the first battery module 110-1.

In FIG. 5, since the temperature $T_{2A}$ of the second battery module 110-2 is higher than the temperature $T_{1A}$ of the first battery module 110-1, the difference value $T_{1A} - T_{2A}$ would be a negative value. When the temperature $T_{2A}$ of the second battery module 110-2 that is measured after measuring the temperature $T_{1A}$ of the first battery module 110-1 is higher than the temperature $T_{1A}$ of the first battery module 110-1, it implies that the temperature of the battery pack 100 is increasing.

Therefore, when the difference value $T_{1A} - T_{2A}$ has a negative value, it may be preferable that the third S-BMS 210-3 is switched to the wake-up mode faster than a time equivalent to a sum of the current time $t_{C2}$ and the first set time period $\Delta t_{S1}$. Here, the M-BMS 220 may set a time corresponding to the sum of the current time $t_{C2}$ and a third set time period $\Delta t_{S3}$ as a next wake-up time of the third S-BMS 210-3. The third set time period $\Delta t_{S3}$ may be obtained by subtracting a compensation time period $\Delta t_{K1}$ from the first set time period $\Delta t_{S1}$. The compensation time period $\Delta t_{K1}$ may have a time length corresponding to the difference value $T_{1A} - T_{2A}$. That is, an equation $t_{3A} = t_{C2} + \Delta t_{S3} = (t_{C2} + \Delta t_{S1}) - \Delta t_{K1}$ is satisfied. Here, the M-BMS 220 may determine the compensation time period $\Delta t_{K1}$ corresponding to the difference value $T_{1A} - T_{2A}$ by using a predetermined algorithm, etc. In FIG. 5, the first S-BMS 210-1 and the third S-BMS 210-3 may be in the sleep mode at least from the time $t_{2A}$ to the time $t_{3A}$.

Next, referring to FIG. 6, it is identified that the temperature $T_{2B}$ of the second battery module 110-2 measured during the wake-up period from the wake-up time $t_{2A}$ to the time $t_{2B}$ when the second S-BMS 210-2 is switched to the sleep mode is lower than the first set temperature $T_{S1}$ and also lower than the temperature $T_{1A}$ of the first battery module 110-1 that is previously measured, contrary to the example of FIG. 5. In this case, the M-BMS 220 may calculate a difference value by subtracting the temperature $T_{2B}$ of the second battery module 110-2 from the temperature $T_{1A}$ of the first battery module 110-1 that is measured latest by the first S-BMS 210-1, that is, $T_{1A} - T_{2B}$. Since the temperature $T_{2B}$ of the second battery module 110-2 is higher than the temperature $T_{1A}$ of the first battery module 110-1, the difference value $T_{1A} - T_{2B}$ would be a positive value. When the difference value $T_{1A} - T_{2B}$ has a positive value, it implies that the battery pack 100 is being cooled down well. That is, a probability of overheating the battery pack 100 is relatively lowered.

Therefore, when the difference value $T_{1A} - T_{2B}$ has a positive value, a time $t_{3A}'$ equivalent to a sum of the current time $t_{C2}$ and a fourth set time period $\Delta t_{S4}$ may be set as a next wake-up time of the third S-BMS 210-3. The fourth set time period $\Delta t_{S4}$ may be longer than the third set time period $\Delta t_{S3}$. For example, the fourth set time period $\Delta t_{S4}$ may be obtained by adding a compensation time period $\Delta t_{K2}$ with the first set time period $\Delta t_{S1}$. The compensation time period $\Delta t_{K2}$ may have a time length corresponding to the difference value $T_{1A}-T_{2B}$. That is, an equation $t_{3A}'=t_{C2}+\Delta t_{S4}=(t_{C2}+\Delta t_{S1})+\Delta t_{K2}$ is satisfied. Here, the M-BMS 220 may determine the compensation time period $\Delta t_{K2}$ corresponding to the difference value $T_{1A}-T_{2B}$ by using a predetermined algorithm, etc. In FIG. 6, the first S-BMS 210-1 and the third S-BMS 210-3 may be in the sleep mode at least from the time $t_{2A}$ to the time $t_{3A}'$.

Figure 7:
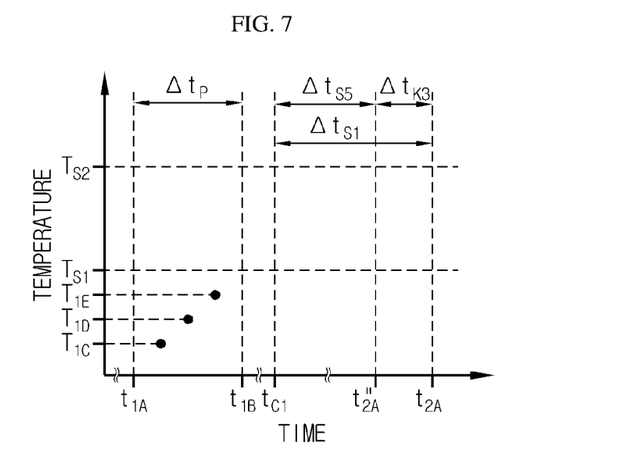
FIGS. 7 and 8 are reference diagrams for illustrating operations of a temperature monitoring apparatus according to another embodiment of the present disclosure.
Figure 8:
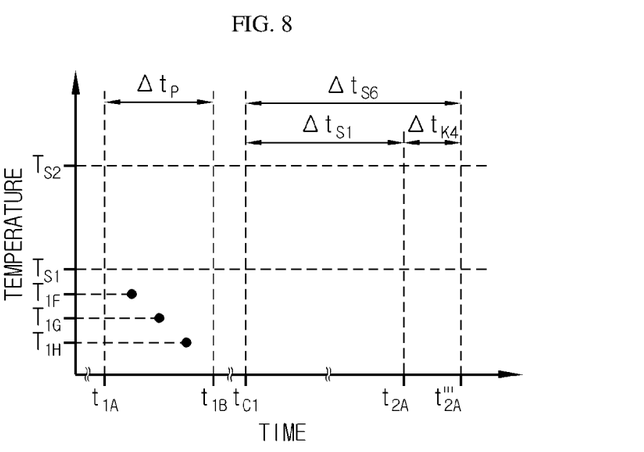

FIGS. 7 and 8 are reference diagrams for illustrating operations of a temperature monitoring apparatus 200 according to another embodiment of the present disclosure.

When comparing with FIG. 3, the embodiment of FIG. 7 is different from that of FIG. 3 in that the temperature of the first battery module 110-1 is measured a plurality of times by the first S-BMS 210-1 during a single wake-up period, that is, from the time $t_{1A}$ to the time $t_{1B}$. In detail, it is equal to the example of FIG. 3 in that the first S-BMS 210-1 remains in the wake-up mode during the predetermined maintaining time period $\Delta t_p$ from the wake-up time $t_{1A}$ that is notified last by the M-BMS 220 and then switches to the sleep mode again. However, the present embodiment is different from the embodiment illustrated with reference to FIG. 3 in that the temperature of the first battery module 110-1 is measured at a plurality of different time points during the single wake-up period. The first S-BMS 210-1 may transmit to the M-BMS 220 first temperature data including a plurality of temperature values of the first battery module 110-1 measured at the plurality of different time points within the single wake-up period.

The M-BMS 220 may analyze a temperature variation pattern of the first battery module 110-1 during the wake-up period based on the first temperature data transmitted from the first S-BMS 210-1. For example, the M-BMS 220 may determine whether the temperature of the first battery module 110-1 increases or decreases according to time lapse.

Also, the M-BMS 220 may set a next wake-up time of the second S-BMS 210-2 based on the temperature of the first battery module 110-1 and the temperature variation pattern.

For example, the temperature of the first battery module 110-1 may gradually rise during the single wake-up period. That is, a temperature inclination of the first battery module 110-1 may have a positive value. For example, as shown in FIG. 7, three temperature values of the first battery module 110-1 measured during the single wake-up period increase with a constant inclination so as to satisfy a condition $T_{1C}<T_{1D}<T_{1E}<T_{S1}$.

In this case, the M-BMS 220 may set a time $t_{2A}''$ equivalent to a sum of the current time $t_{C1}$ and a fifth set time period $\Delta t_{S5}$ as a next wake-up time of the second S-BMS 210-2. Here, the fifth set time period $\Delta t_{S5}$ may be equal to a time obtained by subtracting the compensation time $\Delta t_{K3}$ from the first set time period $\Delta t_{S1}$. That is, an equation $t_{2A}''=(t_{C1}+\Delta t_{S1})-\Delta t_{K3}=t_{C1}+\Delta t_{S5}$ is satisfied. The compensation time $\Delta t_{K3}$ may have a time length corresponding to the temperature inclination of the first battery module 110-1 having a positive value.

FIG. 8 exemplarily shows operations of the temperature monitoring apparatus 200 in a case where a temperature of the first battery module 110-1 gradually decreases during a single wake-up period. A temperature inclination of the first battery module 110-1 may have a negative value. For example, as shown in FIG. 8, three temperature values of the first battery module 110-1 measured during the single wake-up period decrease with a constant inclination so as to satisfy a condition $T_{1H}<T_{1G}<T_{1F}<T_{S1}$.

In this case, the M-BMS 220 may set a time $t_{2A}'''$ equivalent to a sum of the current time $t_{C1}$ and a sixth set time period $\Delta t_{S6}$ as a next wake-up time of the second S-BMS 210-2. Here, the sixth set time period $\Delta t_{S6}$ may be equal to a time obtained by adding a compensation time $\Delta t_{K4}$ with the first set time period $\Delta t_{S1}$. That is, an equation $t_{2A}'''=(t_{C1}+\Delta t_{S1})+\Delta t_{K4}=t_{C1}+\Delta t_{S6}$ is satisfied. The compensation time $\Delta t_{K4}$ may have a time length corresponding to the temperature inclination of the first battery module 110-1 having a negative value.

FIGS. 7 and 8 illustrate that the M-BMS 220 of the temperature monitoring apparatus 200 sets a next wake-up time of the second S-BMS 210-2 according to a temperature variation pattern of the first battery module 110-1, but the same manner may be applied to another battery module. For example, the M-BMS 220 may set a next wake-up time of the third S-BMS 210-3 according to a temperature variation pattern of the second battery module 110-2. As another example, the M-BMS 220 may set a next wake-up time of the first S-BMS 210-1 according to a temperature variation pattern of the third battery module 110-3.

Also, FIGS. 7 and 8 show the example in which the temperature of first battery module 110-1 is lower than the first set temperature $T_{S1}$, but the example may be also applied in a case where the temperature of first battery module 110-1 is equal to or higher than the first set temperature $T_{S1}$ in a similar manner.

Figure 9:
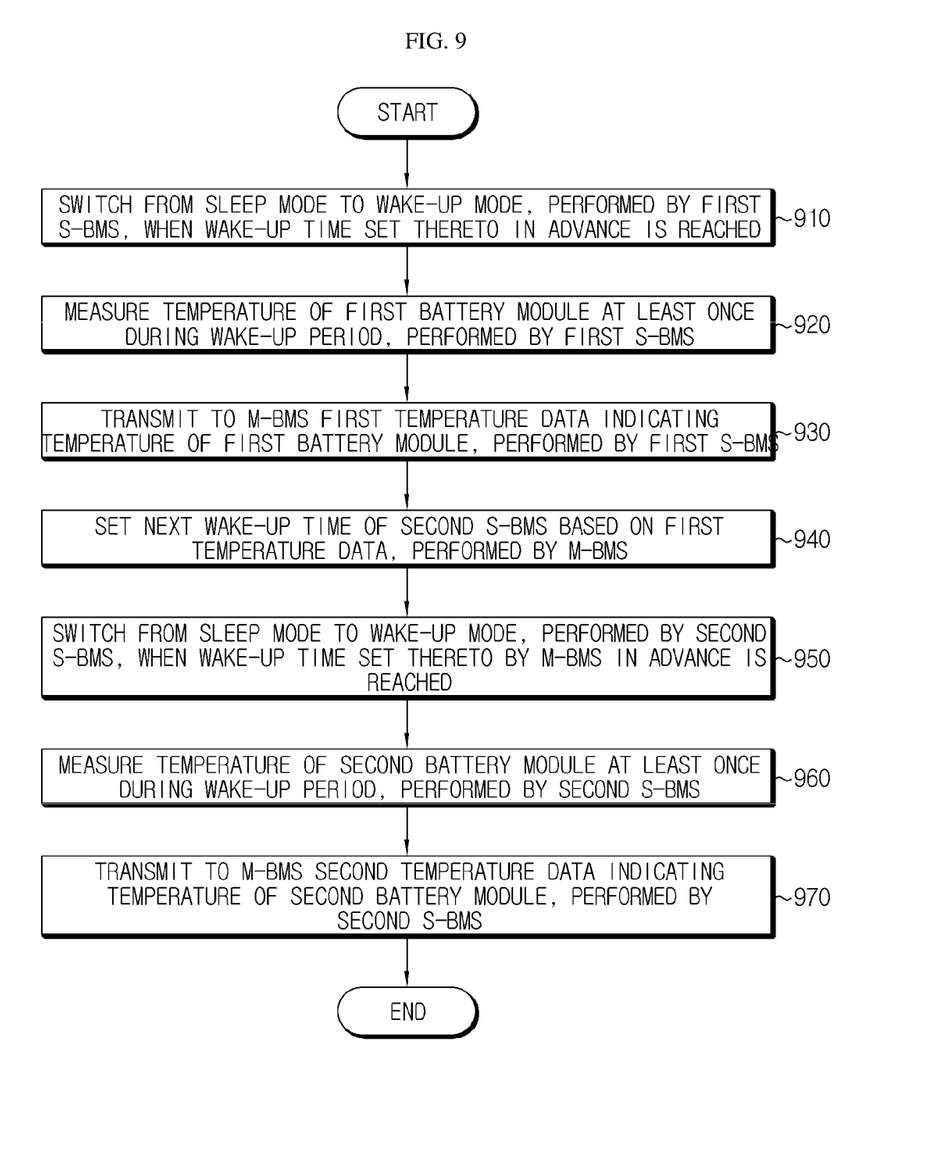
FIG. 9 is a flowchart illustrating a temperature monitoring method of a battery pack, according to an embodiment of the present disclosure.

FIG. 9 is a flowchart illustrating a method of monitoring a temperature of the battery pack 100, according to an embodiment of the present disclosure.

Referring to FIG. 9, at step S910, the first S-BMS 210-1 switches from the sleep mode to the wake-up mode when a wake-up time set thereto by the M-BMS 220 is reached. After step S910, step S920 is performed.

At step S920, the first S-BMS 210-1 measures a temperature of the first battery module 110-1 from among a plurality of battery modules included in the battery pack at least once during a wake-up period. The wake-up period may be defined as a period from the latest time point of switching to the wake-up mode to a time point of re-switching the sleep mode. After step S920, step S930 is performed.

At step S930, the first S-BMS 210-1 transmits to the M-BMS 220 first temperature data indicating the temperature of the first battery module 110-1 measured during the wake-up period. After step S930, step S940 is performed.

At step S940, the M-BMS 220 sets a next wake-up time of the second S-BMS 210-2 based on the first temperature data transmitted from the first S-BMS 210-1 at step S930. For example, in a case where the temperature of the first battery module 110-1 corresponding to the first temperature data is lower than a first set temperature, the M-BMS 220 may set a time equivalent to a sum of the current time and a first set time period as a next wake-up time of the second S-BMS 210-2. As another example, in a case where the temperature of the first battery module 110-1 is equal to or higher than the first set temperature and lower than a second set temperature, the M-BMS 220 may set a time equivalent to a sum of the current time and a second set time period as a next wake-up time of the second S-BMS 210-2. Here, the second set time period may be shorter than the first set time period. After step S940, step S950 is performed.

At step S950, the second S-BMS 210-2 switches from the sleep mode to the wake-up mode when a wake-up time set thereto at step S940 by the M-BMS 220 is reached. After step S950, step S960 is performed.

At step S960, the second S-BMS 210-2 measures a temperature of the second battery module 110-2 from among the plurality of battery modules, during the wake-up period that is defined as a period from the latest time point of switching to the wake-up mode to the time point of re-switching to the sleep mode. After step S960, step S970 is performed.

At step S970, the second S-BMS 210-2 transmits to the M-BMS 220 second temperature data indicating the temperature of the second battery module 110-2 measured during the wake-up period.

Although not shown in the drawing, after step S970, the M-BMS 220 may set a next wake-up time of other S-BMSs than the second S-BMS 210-2, based on the second temperature data transmitted from the second S-BMS 210-2 at step S970.

The above-described embodiments of the present disclosure are not embodied only by an apparatus and/or method. Alternatively, the above-described embodiments may be embodied by a program performing functions, which correspond to the configuration of the exemplary embodiments of the present disclosure, or a recording medium on which the program is recorded, and these embodiments may be easily devised from the description of the above embodiments by one of ordinary skill in the art to which the present invention pertains.

The present disclosure has been described in detail. However, it should be understood that the detailed description and specific examples, while indicating preferred embodiments of the disclosure, are given by way of illustration only, since various changes and modifications within the concept and scope of the disclosure will become apparent to one of ordinary skill in the art from this detailed description.

Also, it will be apparent to one of ordinary skill in the art that modifications and variations may be made without departing from the concept and scope of the present disclosure as defined by the appended claims, and thus, the present disclosure is not limited to the configurations and methods of the foregoing embodiments, but the entirety or a portion of the embodiments may be selectively combined to be configured into various modifications.

The invention claimed is:

1. A temperature monitoring apparatus for a battery pack, the temperature monitoring apparatus comprising:
a plurality of slave battery management systems (BMSs) comprising a first slave BMS and a second slave BMS, wherein each of the plurality of slave BMSs is configured to monitor a temperature of a respective battery module of the battery pack; and
a master BMS connected to the plurality of slave BMSs, wherein the master BMS is configured to transmit a respective wake-up time to each of the plurality of slave BMSs,
wherein each of the plurality of slave BMSs is configured to:
switch from a sleep mode to a wake-up mode when its respective wake-up time is reached;
switch from the wake-up mode back to the sleep mode after passage of a predetermined wake-up period;
measure a temperature of its respective battery module during the wake-up period; and
transmit temperature data indicating the temperature of the respective battery module to the master BMS during the wake-up period; and
wherein the master BMS is configured to:
receive first temperature data from the first slave BMS, wherein the first temperature data indicates a temperature of a first battery module monitored by the first slave BMS;
determine an updated wake-up time of the second slave BMS based on the temperature of the first battery module monitored by the first slave BMS; and
transmit the updated wake-up time to the second slave BMS, whereby the updated wake-up time becomes the respective wake-up time of the second slave BMS.

2. The temperature monitoring apparatus of claim 1, wherein the temperature monitoring apparatus and the battery pack are included in an electric vehicle, and wherein the master BMS is configured to:
receive driving data indicating a driving state of the electric vehicle from the electric vehicle including the battery pack;
determine occurrence of a predefined event based on the driving data; and
determine the updated wake-up time of the second slave BMS in response to occurrence of the predefined event.

3. The temperature monitoring apparatus of claim 1, wherein the master BMS is configured to determine a second updated wake-up time for another one of the plurality of slave BMSs, wherein the second updated wake-up time is different from the wake-up time of the second slave BMS.

4. The temperature monitoring apparatus of claim 1, wherein the master BMS is configured to determine the updated wake-up time of the second slave BMS to equal a sum of a current time and a first predetermined time period, in response to the temperature of the first battery module being lower than a first predetermined temperature threshold.

5. The temperature monitoring apparatus of claim 4, wherein the master BMS is configured to determine the updated wake-up time of the second slave BMS to equal a sum of a current time and a second predetermined time period in response to the temperature of the first battery module being equal to or higher than the first predetermined temperature threshold and lower than a second predetermined temperature threshold, wherein the second predetermined time period is shorter than the first predetermined time period.

6. The temperature monitoring apparatus of claim 4, wherein the plurality of slave BMSs further comprises a third slave BMS, and
wherein the master BMS is configured to:
receive second temperature data from the second slave BMS;
calculate a difference between a temperature of the second battery module indicated by the second temperature data and the temperature of the first battery module indicated by the first temperature data; and
determine an updated wake-up time of the third slave BMS based on the second temperature data and the difference value.

7. The temperature monitoring apparatus of claim 6, wherein the master BMS is configured to determine the updated wake-up time of the third slave BMS to equal:
a sum of a current time and a third predetermined time period in response to the difference value being a negative value; and
a sum of the current time and a fourth predetermined time period in response to the difference value being a positive value,
wherein the fourth predetermined time period is longer than the third predetermined time period.

8. The temperature monitoring apparatus of claim 1, wherein the first temperature data includes a plurality of temperature values indicating respective temperatures of the first battery module at different time points during the wake-up period of the first slave BMS, and
wherein the master BMS is configured to:
analyze a variation pattern in the temperatures of the first battery module during the wake-up period, based on the plurality of temperature values included in the first temperature data; and determine a next wake-up time of the second slave BMS further based on the variation pattern.

9. A battery pack comprising the temperature monitoring apparatus for the battery pack according to claim 1.

10. An electric vehicle comprising the battery pack according to claim 9.

11. A temperature monitoring method for a battery pack, the temperature monitoring method comprising:

switching, by a first slave battery management system (BMS), from a sleep mode to a wakeup mode when a respective wake-up time of the first slave BMS is reached;

switching, by the first slave BMS, from the wake-up mode back to the sleep mode after passage of a predetermined wake-up period;

measuring, by the first slave BMS, a temperature of a first battery module of the battery pack during the wake-up period of the first slave BMS;

transmitting, by the first slave BMS, first temperature data indicating the temperature of the first battery module to the master BMS during the wake-up period of the first slave BMS;

receiving, by the master BMS, the first temperature data from the first slave BMS;

determining, by the master BMS, an updated wake-up time of a second slave BMS based on the temperature of the first battery module;

switching, by the second slave BMS, from the sleep mode to the wake-up mode when the updated wakeup time is reached;

switching, by the second slave BMS, from the wake-up mode back to the sleep mode after passage of the predetermined wake-up period; and measuring, by the second slave BMS, a temperature of a second battery module of the battery pack, during the wake-up period of the second slave BMS.

12. The temperature monitoring method of claim 11, wherein determining the updated wake-up time of the second slave BMS comprises setting the updated wake-up time equivalent to a sum of a current time and a first predetermined time period in response to the temperature of the first battery module being lower than a first predetermined temperature threshold.

13. The temperature monitoring method of claim 12, wherein determining the updated wake-up time of the second slave BMS comprises setting the updated wake-up time equivalent to a sum of a current time and a second predetermined time period in response to the temperature of the first battery module being equal to or higher than the first predetermined temperature threshold and lower than a second predetermined temperature threshold, wherein the second predetermined time period is shorter than the first predetermined time period.

* * * * *